United States Patent
Teshima et al.

(10) Patent No.: US 8,558,956 B2
(45) Date of Patent: Oct. 15, 2013

(54) IMAGE DISPLAY SYSTEM

(75) Inventors: Yoshihiro Teshima, Fukuoka (JP);
Yoshitaka Kitaoka, Kumamoto (JP);
Takayuki Ooie, Fukuoka (JP); Tetsuro Mizushima, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/340,734

(22) Filed: Dec. 30, 2011

(65) Prior Publication Data
US 2012/0176556 A1    Jul. 12, 2012

(30) Foreign Application Priority Data

Jan. 11, 2011 (JP) ................................. 2011-002875
Jun. 7, 2011 (JP) ................................. 2011-127104

(51) Int. Cl.
*H04N 9/31* (2006.01)

(52) U.S. Cl.
USPC ........................................................ 348/760

(58) Field of Classification Search
USPC ............. 348/759, 760, 801, 761; 353/30–34, 353/122, 20; 359/634, 663, 295
See application file for complete search history.

(56) References Cited

U.S. PATENT DOCUMENTS

| | | | | |
|---|---|---|---|---|
| 5,440,352 A | * | 8/1995 | Deter et al. | 348/750 |
| 5,535,047 A | * | 7/1996 | Hornbeck | 359/295 |
| 5,914,818 A | * | 6/1999 | Tejada et al. | 359/663 |
| 6,304,237 B1 | * | 10/2001 | Karakawa | 345/84 |
| 6,736,514 B2 | * | 5/2004 | Horvath et al. | 353/31 |
| 6,807,010 B2 | * | 10/2004 | Kowarz | 359/634 |
| 7,408,558 B2 | * | 8/2008 | Madden et al. | 345/590 |
| 7,926,950 B2 | * | 4/2011 | Mizushima et al. | 353/31 |
| 8,238,029 B2 | * | 8/2012 | Hudman | 359/634 |
| 2010/0091247 A1 | | 4/2010 | Yamamoto | |

FOREIGN PATENT DOCUMENTS

JP    2010-91927    4/2010

* cited by examiner

*Primary Examiner* — Paulos M Natnael
(74) *Attorney, Agent, or Firm* — Greenblum & Bernstein, P.L.C.

(57) ABSTRACT

An image display system comprises red, green and blue laser light sources, a spatial light modulator that modulates the laser light of different colors in a time sharing manner and a controller that controls the operation of the laser light sources and the spatial light modulator. The green and red laser light sources are lit in this order in each frame. The green color is diminished due to the response delay of the spatial light modulator, but the green laser light produced by the green laser light source has a relatively large color phase shift from the standard green color so that the shortage of green color cancels the color phase shift of the generated green color so that the color phase shift of the displayed intermediate color can be minimized.

10 Claims, 19 Drawing Sheets

Fig.6

| lighting interval | 1 | 2 | 3 | 4 | 5 | 6 | 1 | 2 | 3 | 4 | 5 | 6 |
|---|---|---|---|---|---|---|---|---|---|---|---|---|
| light source | R | G | B | R | G | B | R | G | B | R | G | B |
| polarity | p | n | p | n | p | n | p | n | p | n | p | n | one frame

Fig.8

| lighting interval | 1 | 2 | 3 | 4 | 5 | 6 | 1 | 2 | 3 | 4 | 5 | 6 |
|---|---|---|---|---|---|---|---|---|---|---|---|---|
| light source | G | R | B | G | R | B | G | R | B | G | R | B |
| polarity | p | n | p | n | p | n | p | n | p | n | p | n |

Fig. 15

| lighting interval | 1 | 2 | 3 | 4 | 1 | 2 | 3 | 4 |
|---|---|---|---|---|---|---|---|---|
| light source | R | G | B | G | R | G | B | G |
| polarity | p | n | p | n | p | n | p | n | one frame

GBG lighting pattern | GR lighting pattern

Fig. 19

| lighting group | 1 | | 2 | | 3 | | 4 | | 1 | | 2 | |
|---|---|---|---|---|---|---|---|---|---|---|---|---|
| lighting interval | 1a | 1b | 2a | 2b | 3a | 3b | 4a | 4b | 1a | 1b | 2a | 2b |
| light source | R | R | G | G | B | B | G | G | R | R | G | G |
| polarity | p | n | p | n | p | n | p | n | p | n | p | n | one frame (spans lighting groups 1–4)

GBG lighting pattern · GR lighting pattern

US 8,558,956 B2

IMAGE DISPLAY SYSTEM

TECHNICAL FIELD

The present invention relates to an image display system based on a time sharing display process using semiconductor lasers as laser light sources.

BACKGROUND OF THE INVENTION

In recent years, there is a growing interest in the use of the semiconductor laser as the light source of image display systems. The semiconductor laser has various advantages over the mercury lamp which is commonly used as the light source for more conventional image display systems, such as a better color reproduction, the capability to turn on and off instantaneously, a longer service life, a higher efficiency (or a lower power consumption) and the amenability to compact design.

A known image display system using the semiconductor laser typically comprises three laser light source units of red, green and blue colors and a spatial light modulator consisting a liquid crystal display device, and the laser light of a different color produced from each laser light source unit is impinged upon the spatial light modulator in a sequence from one color to another for each frame in a time sharing manner (field sequential process). See JP 2010-091927A. The images of different colors that are projected onto a screen in a sequential manner are perceived by the viewer as a color image of a single frame owing to the afterimage effect. When a plurality of such color images or frames are displayed in a consecutive manner as a motion picture, the images are viewed by the viewer as a continuous color motion picture. According to this technology, as only one spatial light modulator is required, the display device can be constructed as a highly compact unit.

In such a time sharing display process, each frame is divided into a plurality of sub frames (lighting intervals) that are generated by the different laser light sources of red, green and blue colors, and the spatial light modulator controls the output of the laser light of each color in synchronism with the generation of sub frames. In particular, intermediate colors may be produced by combining the laser lights of different colors in the given frame. For instance, when yellow color is to be displayed, the red and green laser lights in two different sub frames are combined or mixed in the given frame.

The liquid crystal display device used for the spatial light modulator has a time delay in response, and the transmissivity thereof increases only gradually after applying a control voltage thereof. Therefore, when the laser lights of two different colors are emitted one after another to produce an intermediate color, the laser light of one of the colors that is emitted first gets diminished as compared to the laser light of the other color that is emitted later, and this causes the produced color to deviate from the intended intermediate color. For instance, when the laser light of yellow color is produced by first emitting red laser light and then emitting green laser light, as the red laser light is diminished by the delay in the response of the spatial light modulator, the produced laser light results in greenish yellow color because of the relative dominance of the green color. As red and green colors have relatively high luminosity factors, a color error in the intermediate color produced by the combination of red and green colors are particularly noticeable to human eyesight.

Furthermore, the green, red and blue colors of the laser lights generated by the green, red and blue laser light source units 22 to 24, respectively, may not be adequately close to the corresponding standard colors. In particular, according to the current technology, the green laser light generated by a green laser light source unit may deviate significantly from the standard green color. This also contributes to the undesired shifting of the color phases of intermediate colors.

BRIEF SUMMARY OF THE INVENTION

The present invention was made in view of such a problem of the prior art, and has a primary object to provide an image display system that can produce intermediate colors by combining red and green colors having relatively high luminosity factors at different ratios with minimized color phase errors.

According to the present invention, such an object can be accomplished by providing an image display system, comprising: a red laser light source unit for emitting red laser light; a green laser light source unit for emitting green laser light having a relatively high y value in the CIE xy color space chromaticity diagram; a blue laser light source unit for emitting blue laser light; a spatial light modulator for modulating the red, green and blue laser lights emitted from the respective laser light source units in a time sharing manner according to a video signal supplied thereto; and a control unit for controlling a lighting of each laser light source unit during one or more of lighting intervals included in each video frame and controlling operation of the spatial light modulator; wherein the control unit is configured to light the green and red laser light source units in that order in each frame.

According to the present invention, when an intermediate color is to be displayed by combining red and green colors, the green color is displayed first and followed by the red color so that the green color is diminished due to the delay in the response of the spatial light modulator. This shortage of green color cancels the color phase shift of the green color generated by the green laser light source so that the color phase shift of the displayed intermediate color can be minimized.

BRIEF DESCRIPTION OF THE DRAWINGS

Now the present invention is described in the following with reference to the appended drawings, in which:

FIG. 6 shows the orders of activating the red, green and blue laser light source units and the polarity of the spatial light modulator according to the prior art;

FIG. 8 shows the orders of activating the red, green and blue laser light source units and the polarity of the spatial light modulator according to a first embodiment of the present invention;

FIG. 15 shows the orders of activating the red, green and blue laser light source units and the polarity of the spatial light modulator according to a fourth embodiment of the present invention;

FIG. 19 shows the orders of activating the red, green and blue laser light source units and the polarity of the spatial light modulator according to a sixth embodiment of the present invention.

DETAILED DESCRIPTION OF THE PREFERRED EMBODIMENT(S)

Figure 1:
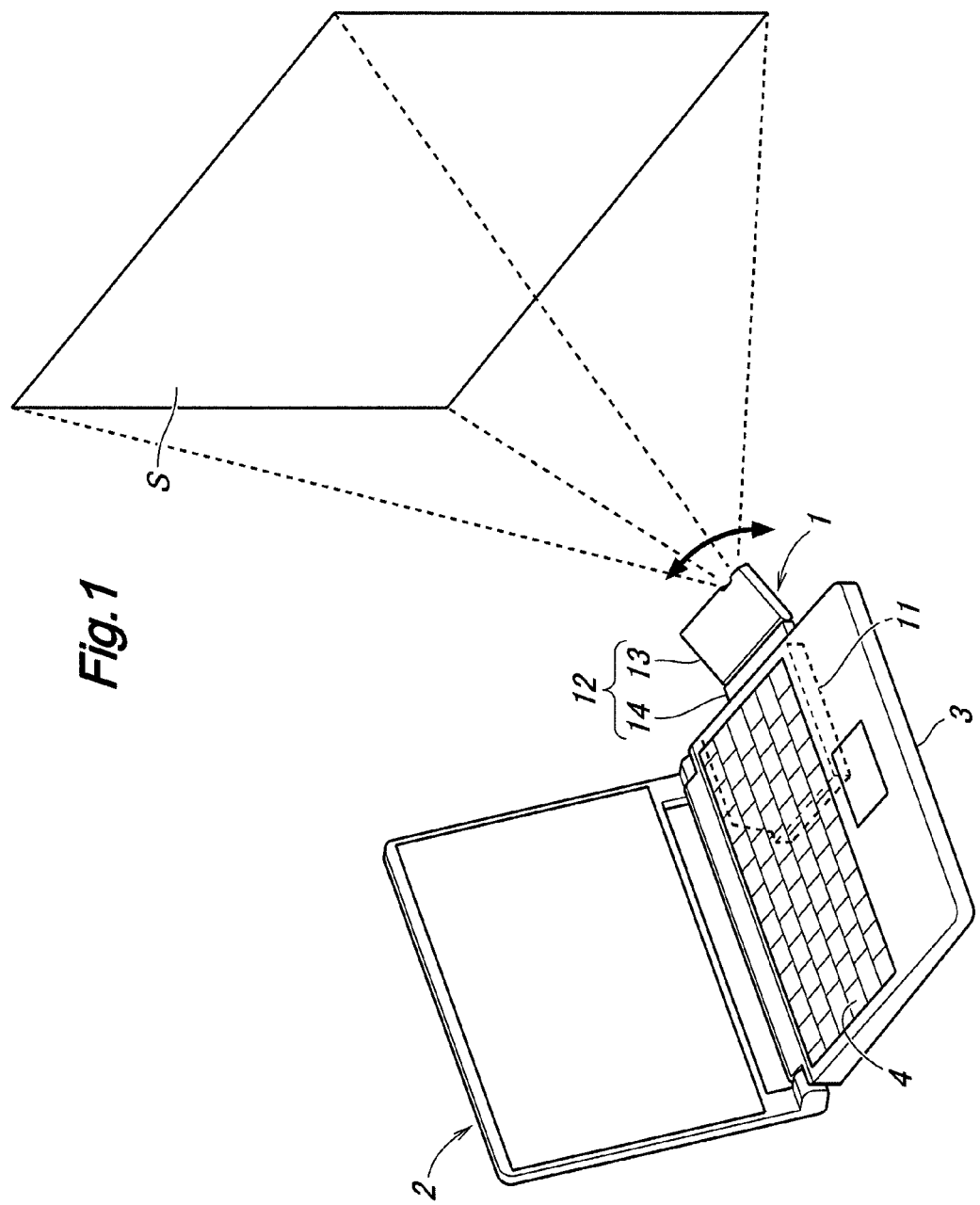
FIG. 1 is a perspective view of a laptop information processing apparatus 2 incorporated with an image display system 1 embodying the present invention.

According to a first aspect of the present invention, the present invention provides an image display system, comprising: a red laser light source unit for emitting red laser light; a green laser light source unit for emitting green laser light having a relatively high y value in the CIE xy color space chromaticity diagram; a blue laser light source unit for emitting blue laser light; a spatial light modulator for modulating the red, green and blue laser lights emitted from the respective laser light source units in a time sharing manner according to a video signal supplied thereto; and a control unit for controlling a lighting of each laser light source unit during one or more of lighting intervals included in each video frame and controlling operation of the spatial light modulator; wherein the control unit is configured to light the green and red laser light source units in that order in each frame.

According to this aspect of the present invention, when an intermediate color is to be displayed by combining red and green colors, the green color is displayed first and followed by the red color so that the green color is diminished owing to the delay in the response of the spatial light modulator 25. This shortage of green color cancels out with the color phase shift of the green color generated by the green laser light source unit so that the color phase shift of the displayed intermediate color can be minimized.

In this case, a RG (red and green) lighting pattern and a GR (green and red) lighting pattern may coexist in each frame as long as the GR lighting pattern is no less numerous than the RG lighting pattern for an intermediate color produced by a combination of red and green colors be minimized of a color phase shift.

According to a second aspect of the present invention, the control unit is configured to light at least one of the red and green light source units more frequently than the blue laser light source unit in each frame.

According to this aspect of the present invention, as the lighting intervals for at least one of red and green colors having relatively higher luminosity factors occur more often than lighting intervals for blue color, the color breaking can be avoided even when the switching speed of the different laser light sources and/or the response speed of the spatial light modulator are not very high.

According to a third aspect of the present invention, the control unit is configured to light the green, blue and green light source units in that order in each frame.

When an intermediate color is to be displayed by combining green and blue colors, the first green output is diminished owing to the response delay of the spatial light modulator while the second blue output and the third green output are unaffected, and not diminished. However, according to this aspect of the present invention, the shortage of the first green color output cancels out with the color phase shift of the green color generated by the green laser light source unit so that the color phase shift of the displayed intermediate color can be minimized.

According to a fourth aspect of the present invention, each frame consists of an odd number of lighting intervals, and a polarity pattern of the spatial light modulator is reversed from one frame to another.

According to this aspect of the present invention, the polarity of the spatial light modulator is reversed for each succeeding lighting interval so that the residual electric charges are adequately removed from the spatial light modulator for each sub frame, and an undesired stress to the spatial light modulator can be avoided.

According to a fifth aspect of the present invention, the green laser light source unit comprises a semiconductor laser for generating an excitation laser light, a solid laser device for generating an infrared laser light by being excited by the excitation laser light generated by the semiconductor laser and a wavelength converting device for converting the infrared laser light generated by the solid state laser device into green laser light.

According to this aspect of the present invention, a green laser light of a high output can be produced. In such a case, as the produced green laser light has a significantly higher y value as compared with the standard green color, the present invention is particularly advantageous.

According to a sixth aspect of the present invention, lighting of the green and red laser light source units in that order is performed from an end of one frame to a beginning of a succeeding frame.

According to this aspect of the present invention, when an intermediate color is to be displayed by combining red and green colors, the green color is displayed first and followed by the red color from the end of one frame to the beginning of the next frame so that the green color is diminished owing to the delay in the response of the spatial light modulator. This shortage of green color cancels out with the color phase shift of the green color generated by the green laser light source unit so that the color phase shift of the displayed intermediate color can be minimized.

FIG. 1 is a perspective view of an information processing apparatus 2 incorporated with an image display system 1 embodying the present invention. The information processing apparatus 2 of the illustrated embodiment is constructed as a laptop computer including a main body 3 having a keyboard 4 formed on one side (upper side in FIG. 1) thereof, and a display panel hinged to the main body 3 in a per se known manner. The main body 3 internally defines a storage space or a drive bay behind the keyboard 4 in which an image display system 1 can be received from a side end of the main body 3, and can be pulled out from the side end as required.

The image display system 1 includes a housing 11 and a moveable part 12 slidably or retractably connected to the housing 11. The moveable part 12 includes an optical engine unit 13 receiving various optical components for projecting laser light onto a screen S therein and a control unit 14 receiving a circuit board and associated electric components for controlling the optical engine unit 13 therein. The optical engine unit 13 is hinged to the control unit 14 so as to be selectively tilted with respect to the control unit 14.

When the image display system 1 is not in use, the moveable part 12 is fully received in the housing 11. When the image display system 1 is in use, the moveable part 12 is pulled out from the housing 11, and the laser light from the optical engine unit 13 is projected onto the screen S by appropriately tilting the optical engine unit 13 with respect to the control unit 14.

Figure 2:
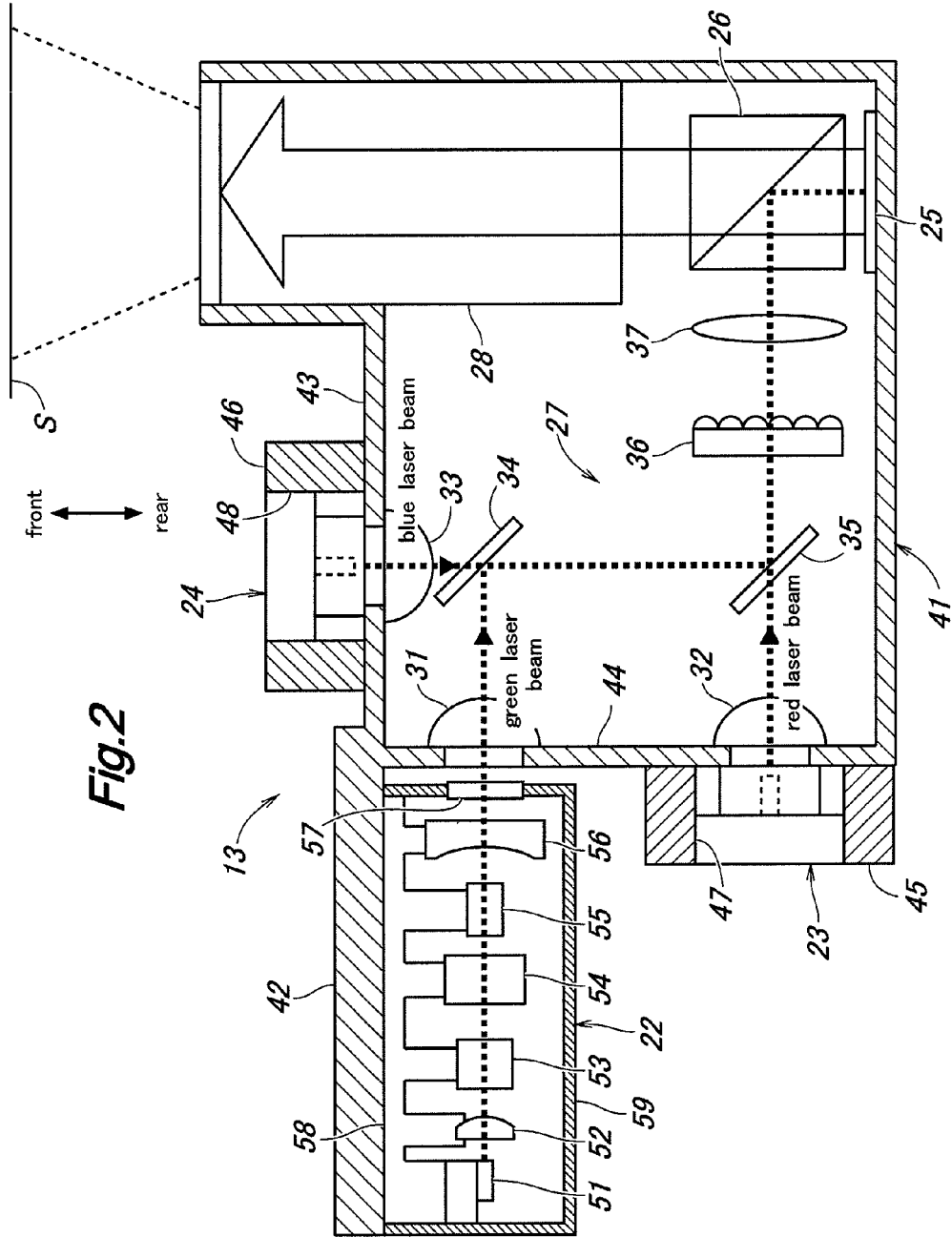
FIG. 2 is a schematic diagram illustrating an optical engine unit 13 of the image display system.

FIG. 2 is a schematic diagram illustrating the optical engine unit 13 of the image display system 1. The optical engine unit 13 is configured to project a given image onto the screen S, and comprises a green laser light source unit 22 for emitting a green laser beam, a red laser light source unit 23 for emitting a red laser beam, a blue laser light source unit 24 for emitting a blue laser beam, a spatial light modulator 25 of a reflective LCD type for forming the required image by spatially modulating the laser beams from the green, red and blue laser light source units 22 to 24 according to the given video signal, a polarizing beam splitter 26 that reflects the laser beams emitted from the green, red and blue laser light source units 22 to 24 onto the spatial light modulator 25 and transmits the modulated laser beam emitted from the spatial light modulator 25, a relay optical system 27 for directing the laser beams emitted from the green, red and blue laser light source units 22 to 24 to the beam splitter 26, and a projection optical system 28 for projecting the modulated laser beam transmitted through the beam splitter 26 onto the screen S.

The image display system 1 is configured to display a color image on the screen S by using the field sequential process (time sharing display process), and the laser beams of different colors are emitted from the corresponding laser light source units 22 to 24 sequentially in a time sharing manner so that the laser beams of the different colors emitted intermittently and projected onto the screen are perceived as a unified color afterimage.

The relay optical system 27 comprises collimator lenses 31 to 33 for converting the laser beams of different colors emitted from the corresponding laser light source units 22 to 24 into parallel beams of the different colors, first and second dichroic mirrors 34 and 35 for directing the laser beams of the different colors exiting the collimator lenses 31 to 33 in a prescribed direction, a diffusion plate 36 for diffusing the laser beams guided by the dichroic mirrors 34 and 35 and a field lens 37 for converting the laser beam transmitted through the diffusion plate 36 into a converging laser beam.

If the side of the projection optical system 28 from which the laser beam is emitted to the screen S is defined as the front side, the blue laser light source unit 24 emits the blue laser beam in the rearward direction. The green and red laser light source units 22 and 23 emit the green laser beam and red laser beam, respectively, in a direction perpendicular to the blue laser beam. The blue, red and green laser beams are conducted to a common light path by the two dichroic mirrors 34 and 35. In other words, the blue laser beam and green laser beam are conducted to a common light path by the first dichroic mirror 3, and the blue laser beam, red laser beam and green laser beam are conducted to a common light path by the second dichroic mirror 3.

The surface of each dichroic mirror 34, 35 is coated with a film that selectively transmits light of a prescribed wavelength while reflecting light of other wavelengths. The first dichroic mirror 34 transmits the blue laser beam while reflecting the green laser beam, and the second dichroic mirror 35 transmits the red laser beam while reflecting the blue and green laser beams.

These optical components are received in a housing 41 which is made of thermally conductive material such as aluminum and copper so as to serve as a heat sink for dissipating the heat generated from the laser light source units 22 to 24. The housing 41 additionally receives the spatial light modulator 25, the beam splitter 26, the relay optical system 27 and the projection optical system 28.

The green laser light source unit 22 is mounted on a mounting plate 42 secured to the housing 41 and extending laterally from the main body 41a of the housing 41. The mounting plate 42 serves as a heat sink by extending from the corner between a front wall 43 and a side wall 44 of the housing 41 (which are located on the front and side of the storage space receiving the relay optical system 27, respectively) in a direction perpendicular to the side wall 44. Thereby, the heat is favorably removed from the green laser light source unit 42 and the removed heat is prevented from being transmitted back to the housing 41 so that the thermal effect on the remaining two laser light source units 23 and 24 may be minimized. The red laser light source unit 23 is retained in a holder 45 which is in turn attached to the outer surface of the side wall 44, and the blue laser light source unit 24 is retained in a holder 46 which is in turn attached to the outer surface of the front wall 43.

The red and blue laser light source units 23 and 24 are each prepared in a CAN package in which a laser chip supported by a stem is placed on the central axial line of a can so as to emit a laser beam in alignment with the central axial line of the can and out of a glass window provided on the can. The red and blue laser light source units 23 and 24 are secured to the respective holders 45 and 46 by being press fitted into mounting holes 47 and 48 formed in the corresponding holders 45 and 46. The heat generated in the laser chips of the red and blue laser light source units 23 and 24 is transmitted to the housing 41 via the holders 45 and 46, and is dissipated to the surrounding environment from the housing 41. The holders 45 and 46 may be made of thermally conductive material such as aluminum and copper.

As shown in FIG. 2, the green laser light source unit 22 comprises a semiconductor laser 51 for producing an excitation laser beam, a FAC (fast axis collimator) lens 52 and a rod lens 53 for collimating the excitation laser beam produced from the semiconductor lens 51, a laser medium 54 for producing a base wavelength laser beam (infrared laser beam) through excitation by the excitation laser beam, a wavelength converting device 55 for producing a half wavelength laser beam (green laser beam) by converting the wavelength of the base wavelength laser beam, a concave mirror 56 for forming a resonator in cooperation with the laser medium 54, a glass cover 57 for preventing the leakage of the excitation laser beam and base wavelength laser beam, a base 58 for supporting the various component parts and a cover member 59 covering the various components.

As shown in FIG. 2, a gap of a prescribed width (such as 0.5 mm or less) is formed between the green laser light source unit 22 and the side wall 44 of the housing 41. Thereby, the heat generated from the green laser light source unit 22 is insulated from the red laser light source unit 23 so that the red laser light source unit 23 having a relatively low tolerable temperature is prevented from heat, and is enabled to operate in a stable manner. To obtain a required adjustment margin (such as about 0.3 mm) for the optical center line of the red laser light source unit 23, a certain gap (such as 0.3 mm or more) is provided between the green laser light source unit 22 and the red laser light source unit 23.

Figure 3:
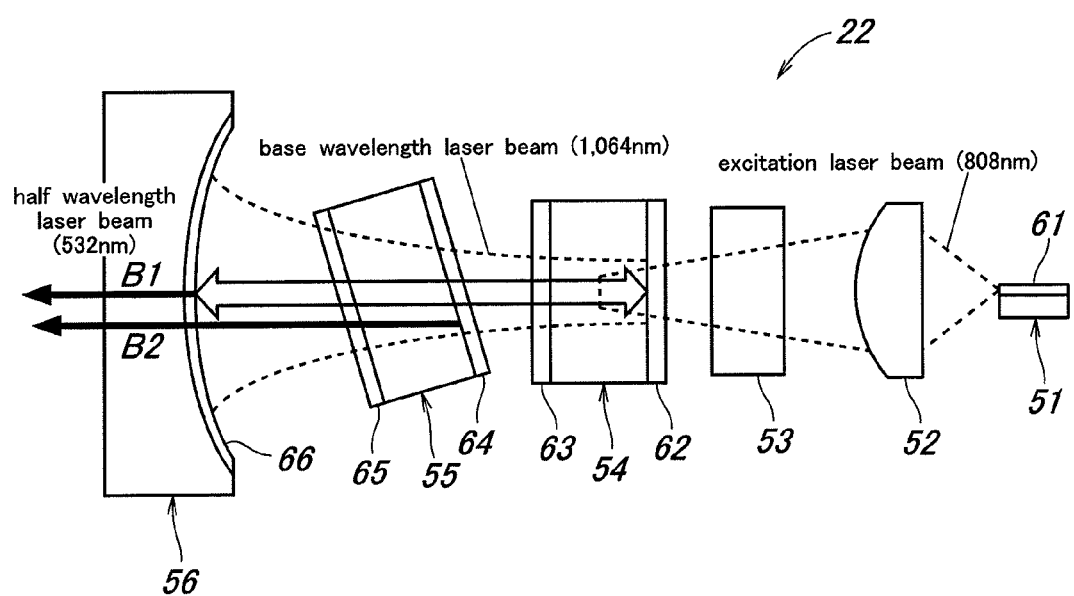
FIG. 3 is a diagram showing how a green laser beam is generated by a green laser light source unit 22 of the image display system.

FIG. 3 is a diagram showing how the green laser beam is generated by the green laser light source unit 22 of the image display system 1. The semiconductor laser 51 comprises a laser chip 61 that produces an excitation laser beam having a wavelength of 808 nm. The FAC lens 52 reduces the expansion of the laser beam in the direction of the fast axis of the laser beam (which is perpendicular to the optical axial line and in parallel with the plane of the paper of the drawing), and the rod lens 53 reduces the expansion of the laser beam in the direction of the slow axis of the laser beam (which is perpendicular to the plane of the paper of the drawing).

The laser medium 54 consists of a solid laser crystal that produces a base wavelength laser beam (infrared laser beam) having a wavelength of 1,064 nm by the excitation caused by the excitation laser beam having the wavelength of 808 nm. The laser medium 54 may be prepared by doping inorganic optically active substance (crystal) consisting of Y (yttrium) and $VO_4$ (vanadate) with Nd (neodymium). In particular, yttrium in $YVO_4$ is substituted by $Nd^{+3}$ which is fluorescent.

The side of the laser medium 54 facing the rod lens 53 is coated with a film 62 designed to prevent the reflection of the excitation laser beam having the wavelength of 808 nm, and fully reflect the base wavelength laser beam having the wavelength of 1,064 nm and the half wavelength laser beam having the wavelength of 532 nm. The side of the laser medium 54 facing the wavelength converting device 55 is coated with a film 63 designed to prevent the reflection of both the base wavelength laser beam having the wavelength of 1,064 nm and the half wavelength laser beam having the wavelength of 532 nm.

The wavelength converting device 55 consists of a SHG (Second Harmonics Generation) device that is configured to convert the base wavelength laser beam (infrared laser beam) having the wavelength of 1,064 nm generated by the laser medium 54 into the half wavelength laser beam having the wavelength of 532 nm (green laser beam). The wavelength converting device 55 includes a ferroelectric crystal formed with periodically poled regions, and the base wavelength laser beam is directed along the direction of the alternating arrangement of the periodically poled regions. The ferroelectric crystal may consist of LN (lithium niobate) added with MgO.

The side of the wavelength converting device 55 facing the laser medium 54 is coated with a film 64 that prevents the reflection of the base wavelength laser beam having the wavelength of 1,064 nm, and fully reflects the half wavelength laser beam having the wavelength of 532 nm. The side of the wavelength converting device 55 facing the concave mirror 56 is coated with a film 65 that prevents the reflection of both the base wavelength laser beam having the wavelength of 1,064 nm and the half wavelength laser beam having the wavelength of 532 nm.

The concave mirror 56 is provided with a concave surface that faces the wavelength converting device 55, and the concave surface is coated with a film 66 that fully reflects the base wavelength laser beam having the wavelength of 1,064 nm, and prevents the reflection of the half wavelength laser beam having the wavelength of 532 nm. Thereby, the base wavelength laser beam having the wavelength of 1,064 nm is amplified by resonance between the film 62 of the laser medium 54 and the film 66 of the concave mirror 56.

The wavelength converting device 55 converts a part of the base wavelength laser beam having the wavelength of 1,064 nm received from the laser medium 54 into the half wavelength laser beam having the wavelength of 532 nm, and the remaining part of the base wavelength laser beam having the wavelength of 1,064 nm that has transmitted through the wavelength converting device 55 without being converted is reflected by the concave mirror 56, and re-enters the wavelength converting device 55 to be converted into the half wavelength laser beam having the wavelength of 532 nm. The half wavelength laser beam having the wavelength of 532 nm is reflected by the film 64 of the wavelength converting device 55, and exits the wavelength converting device 55.

If the laser beam B1 that enters the wavelength converting device 55 from the laser medium 54, and exits the wavelength converting device 55 after being converted of the wavelength thereof interferes with the laser beam B2 that is reflected by the concave mirror 56, and exits the wavelength converting device 55 after being reflected by the film 64, the laser output may be reduced. To avoid this problem, the wavelength converting device 55 is tilted with respect to the optical axial line so that the laser beams B1 and B2 are prevented from interfering with each other owing to the refraction of the laser beams B1 and B2, and the reduction in the laser output can be avoided.

The glass cover 57 shown in FIG. 2 is formed with a film that prevents the leakage of the base wavelength laser beam having the wavelength of 1,064 nm and the half wavelength laser beam having the wavelength of 532 nm to the outside.

Figure 4:
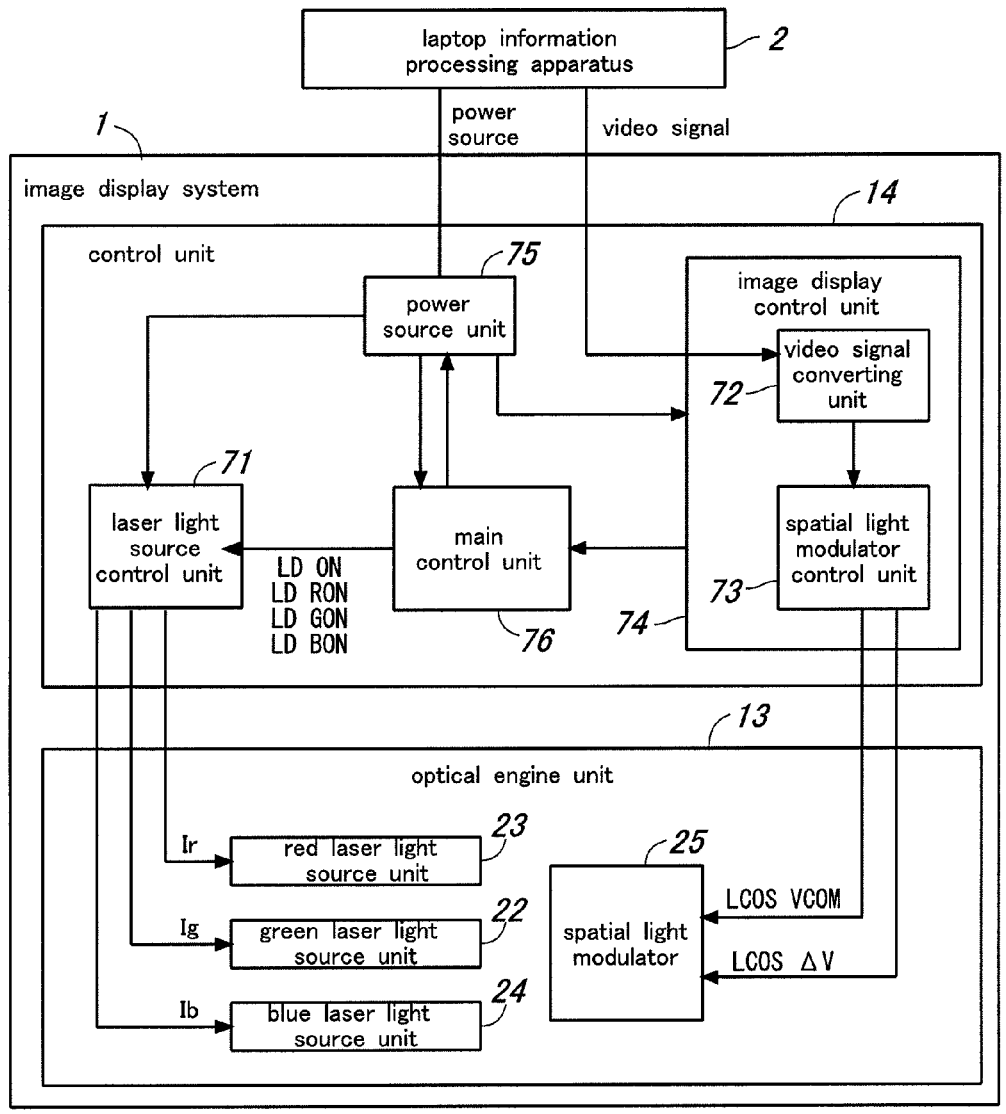
FIG. 4 is a functional block diagram of the image display system 1.

FIG. 4 is a functional block diagram of the image display system 1 of the present embodiment. The control unit 14 includes a laser light source control unit 71 for controlling the laser light source units 22 to 24 for the different colors, an image display control unit 74 including a video signal converting unit 72 for converting the video signal received from the portable information processing apparatus 2 into the corresponding control signal for the spatial light modulator 25 and a spatial light modulator control unit 73 for controlling the spatial light modulator 25, a power source unit 75 for supplying electric power supplied by the portable information processing apparatus 2 to the laser light source control unit 71 and the image display control unit 74, and a main control unit 76 responsible for the overall control of the various parts of the system.

The main control unit 76 generates control signals for controlling the operation of the laser light source units 22 to 24 for the different colors according to the video display signal forwarded from the image display control unit 74, and forwards the control signals to the laser light source units 22 to 24 via the laser light source control unit 71. The control signals include a lighting permission signal (LD ON) for permitting the lighting of any of the laser light source units 22 to 24, and a red lighting signal (LD RON), a green light signal (LD GON) and a blue light signal (LD BON) for individually lighting the red, green and blue laser light source units 22 to 24, respectively.

The laser light source control unit 71 forwards a drive control signal (Ig, Ir, Ib) for controlling the application of a drive current to each of the laser light source units 22 to 24 according to the control signal received from the main control unit 76.

The spatial light modulator control unit 73 generates control signals including a reference voltage signal (LCOS VCOM) and a pixel voltage signal (LCOS ΔV) for controlling the operation of the spatial light modulator 25 according to the video signal received from the main control unit 76, and forwards the generated control signals to the spatial light modulator 25. In practice, there are a same number of pixel voltage signals (LCOS ΔV) as the number of pixels contained in the spatial light modulator 25, but for the convenience of description, the pixel voltage signal (LCOS ΔV) for the n-th pixel of the spatial light modulator 25 is collectively referred to as the pixel voltage signal (LCOS ΔV).

The spatial light modulator 25 consists of a reflective LCD device or an LCOS (liquid crystal on Silicon) device in which the incident light is transmitted through a liquid crystal layer formed on a silicon substrate and reflected by a reflective layer of the silicon substrate. The spatial light modulator 25 changes the output (luminous intensity) of the incident laser light according to the pixel voltage signal (LCOS ΔV) received from the spatial light modulator control unit 73, and produces the desired color phase by controlling the output of the laser light of each of the basic colors that are supplied by the red, green and blue laser light source units 22 to 24 in a time sharing manner.

The polarity (p and n) of the spatial light modulator 25 is also controlled by the reference voltage signal (LCOS VCOM) supplied by the spatial light modulator control unit 73 so that the pixel voltage signal (LCOS ΔV) is reversed depending on the polarity of the reference voltage signal (LCOS VCOM).

Figure 5:
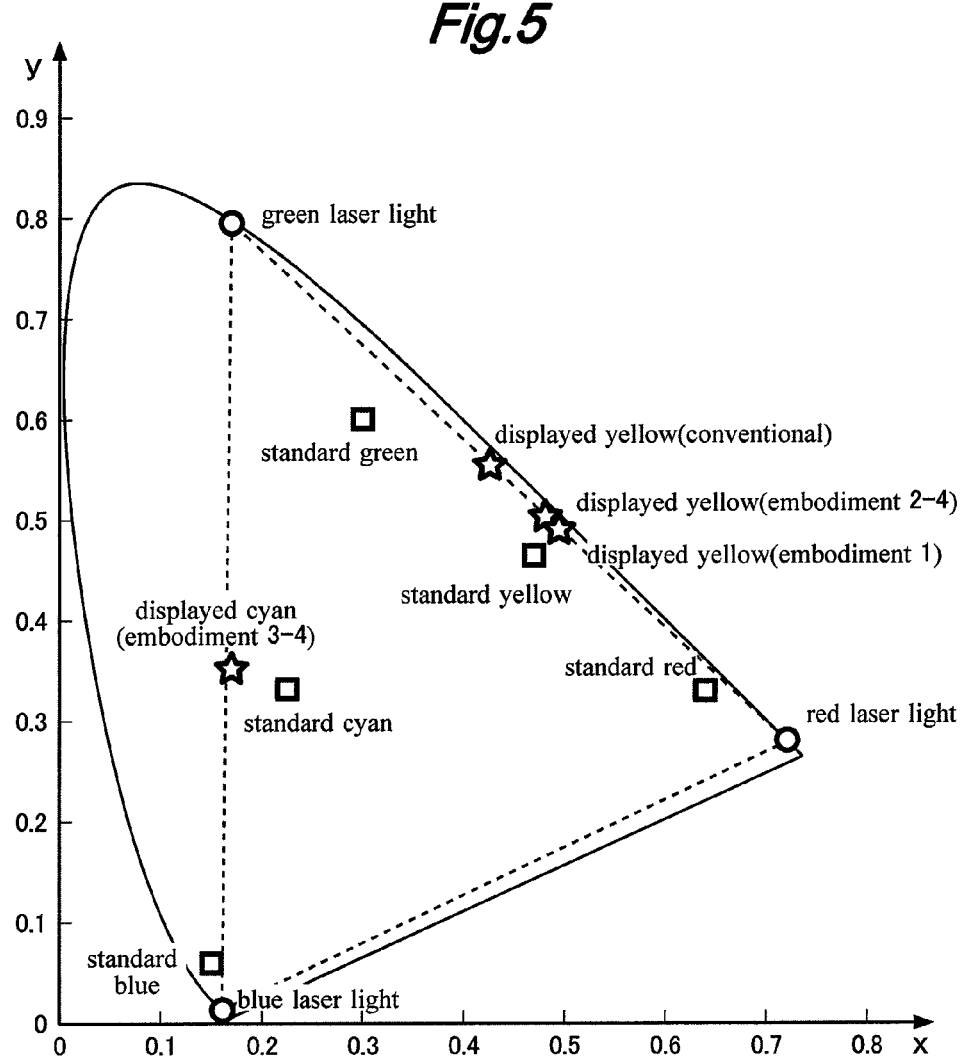
FIG. 5 is a CIE xy color space chromaticity diagram indicating the chromaticities of the laser lights produced by the conventional arrangement and the various embodiments of the present invention.

FIG. 5 shows a CIE xy color space chromaticity diagram indicating the chromaticities of the laser lights produced by the red, green and blue laser light source units 22 to 24 in comparison with standard colors. The color phases of the intermediate colors (yellow and cyan) that are produced by the prior art and the various embodiments of the present invention are also indicated on this diagram.

The red laser light emitted from the red laser light source unit 23 (x=0.719, y=0.281), the green laser light emitted from the green laser light source unit 22 (x=0.170, y=0.796) and the blue laser light emitted from the blue laser light source unit 24 (x=0.161, y=0.014) deviate from the standard red color (x=0.640, y=0.330), the standard green color (x=0.300, y=0.600) and the standard blue color (x=0.150, y=0.060), respectively. In particular, the green laser light emitted from the green laser light source unit 22 deviates significantly from the standard green color.

FIG. 6 shows the order of the lighting the red, green and blue laser light source units 22 to 24, and the associated changes in the polarity of the spatial light modulator 25 according to the prior art. Each frame is divided into six sub frames (six lighting intervals) so that each color is lighted twice in each frame. In this case, the laser lights are lighted in the order of red, green and blue (RGB).

Figure 7:
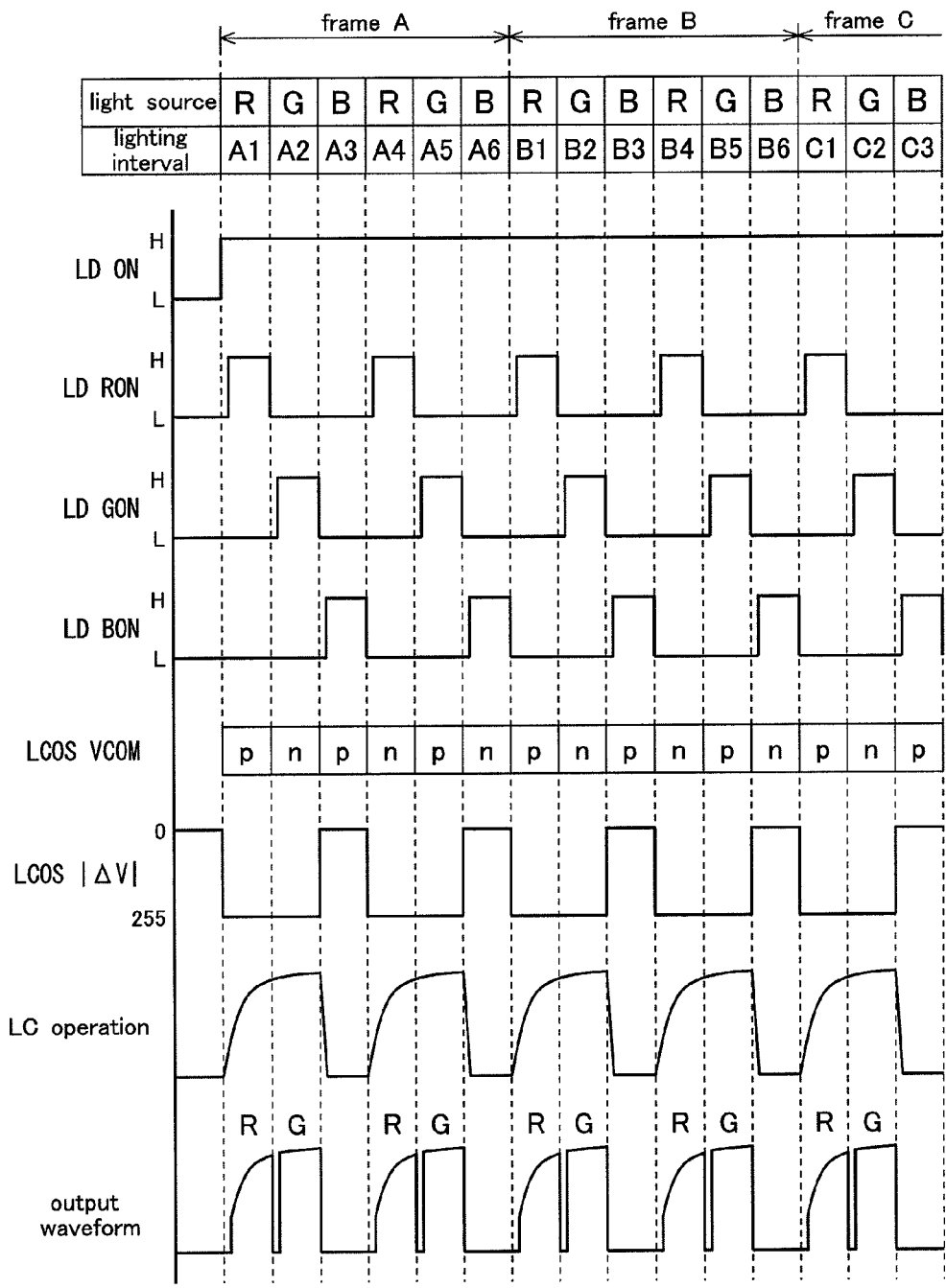
FIG. 7 is a time chart of the control signals for the red, green and blue laser light source units, the operation state of the spatial light modulator and the laser light output when displaying yellow color according to the prior art.

FIG. 7 shows the sequences of the control signals, the operation of the spatial light modulator 25 and the relevant waveforms. The control unit 74 forwards the lighting permission signal (LD ON) as well as the red lighting signal (LD RON), the green light signal (LD GON) and the blue light signal (LD BON) to the laser light source control unit 71. When the lighting permission signal (LD ON) is supplied, the red, green and blue laser light source units 22 to 24 can be individually lighted upon receiving the red lighting signal (LD RON), the green light signal (LD GON) and the blue light signal (LD BON), respectively.

As the spatial light modulator control unit 73 forwards the reference voltage signal (LCOS VCOM) and the pixel voltage signal (LCOS ΔV) to the spatial light modulator 25, the polarity of the spatial light modulator 25 is switched over according to the reference voltage signal (LCOS VCOM), and the transmissivity of the spatial light modulator 25 is varied depending on the pixel voltage signal (LCOS ΔV) so that the output (luminous intensity) of the laser light of each color can be individually adjusted.

When yellow color (255, 255, 0: RGB 8 bit signal) is to be displayed, the spatial light modulator 25 is required to produce red and green colors. Therefore, the absolute values of the pixel voltage signals (LCOS|ΔV|) are maximized during the intervals for lighting the red and green laser lights, and the outputs of the corresponding laser light sources are put at the highest level (255). As a RGB lighting pattern is used or the laser light source units 22 to 24 are lighted in the order of red, green and blue colors, the spatial light modulator 25 produces the laser lights in the order of red and green.

As discussed earlier, the spatial light modulator 25 involves some delay in response. Therefore, when a control voltage is applied to the spatial light modulator 25, the transmissivity thereof increases only gradually (see "LC operation" in FIG. 7). Therefore, when yellow color is to be displayed, the transmissivity of the spatial light modulator 25 increases gradually during the red lighting period which precedes the green lighting period so that the effective output of the red laser light is diminished as compared with that of the green laser light (see "waveform" in FIG. 7).

As mentioned earlier, the green laser light (x=0.170, y=0.796) emitted from the green laser light source unit 22 has a higher y value than the standard green color (x=0.300, y=0.600). In other words, the green laser light shifts the color phase of the displayed green color in the direction of more pure green color. Therefore, this combined with the reduction in the red color owing to the delay in the response of the spatial light modulator 25 causes the displayed yellow color to be greenish yellow color which is somewhat shifted from the standard yellow color (x=0.470, y=0.465) in the direction of pure green color as shown in FIG. 5.

FIG. 8 shows the order of the lighting the red, green and blue laser light source units 22 to 24, and the associated changes in the polarity of the spatial light modulator 25 according to a first embodiment of the present invention. Each frame is divided into six sub frames (six lighting intervals) similarly as the prior art so that each color is lighted twice in each frame. In this case, the laser light source units 22 to 24 are lighted in the order of green, red and blue (GRB) or the order of red and green is reversed from that of the prior art.

Figure 9:
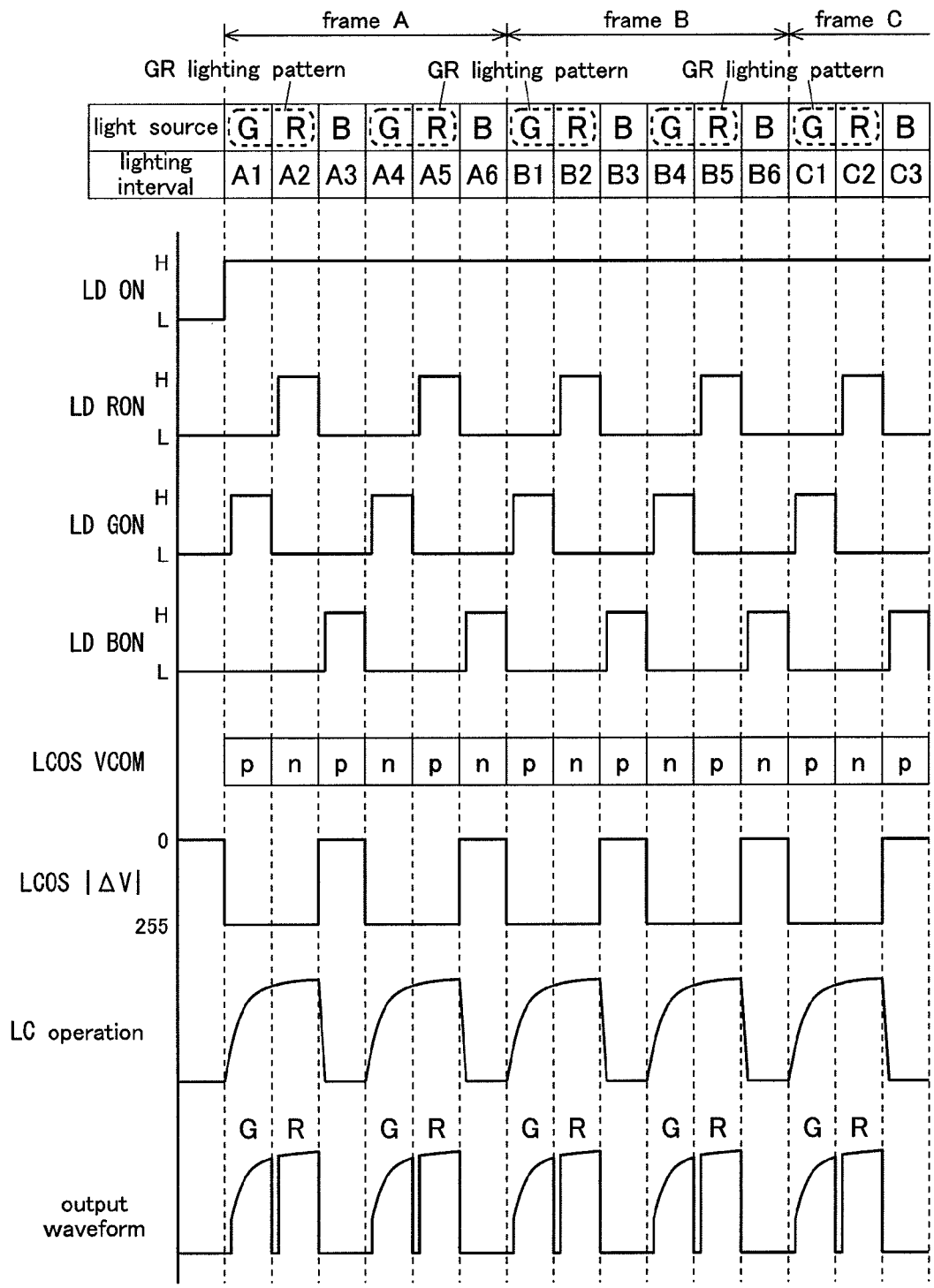
FIG. 9 is a time chart of the control signals for the red, green and blue laser light source units, the operation state of the spatial light modulator and the laser light output when displaying yellow color according to the first embodiment.

FIG. 9 shows the sequences of the control signals, the operation of the spatial light modulator 25 and the relevant waveforms when yellow color is displayed in the first embodiment. In the first embodiment, the lighting of green laser light and red laser light in that order (GR lighting pattern) occurs twice in each frame, and the lighting of red laser light and green laser light in that order (RG lighting pattern) does not occur. (In other words, the occurrences of the GR lighting pattern are more numerous than the occurrences of the RG lighting pattern.) Therefore, when yellow color (255, 255, 0) is to be displayed, the spatial light modulator 25 lights green laser light and red laser light in that order. At this time, owing to the delay in the response of the spatial light modulator 25, the effective output of the preceding green laser light gets diminished while the effective output of the red laser light that follows it is not diminished, and is therefore more dominant than the green laser light.

The green laser light (x=0.170, y=0.796) emitted from the green laser light source unit 22 has a higher y value than the standard green color (x=0.300, y=0.600) as mentioned earlier so that this deviation or shifting of color phase is compensated by the reduction in the output of the green laser light owing to the delay in the response of the spatial light modulator 25. As a result, the deviation of the displayed yellow color from the intended yellow color can be minimized, and can be brought close to the standard yellow color as shown in FIG. 5.

Figure 10:
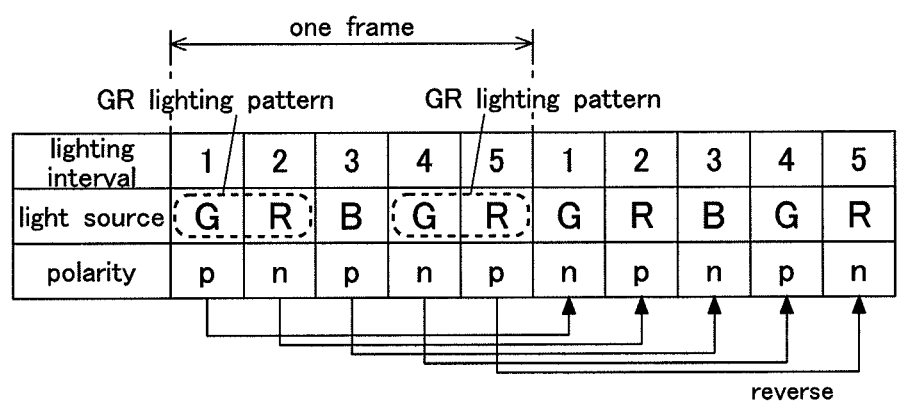
FIG. 10 shows the orders of activating the red, green and blue laser light source units and the polarity of the spatial light modulator according to a second embodiment of the present invention.

FIG. 10 shows the order of the lighting the red, green and blue laser light source units 22 to 24, and the associated changes in the polarity of the spatial light modulator 25 according to a second embodiment of the present invention. Each frame is divided into five sub frames (five lighting intervals), and the GR lighting patterns occur twice separated by a blue lighting interval. Therefore, the second embodiment is modified from the first embodiment by omitting the blue lighting interval at the end of each frame.

According to the second embodiment, as the lighting intervals for red and green colors having relatively higher luminosity factors occur more often than lighting intervals for blue color, the color breaking can be avoided.

As each frame consists of an odd number of sub frames, if a same pattern of the polarity of the spatial light modulator 25 were repeated for each frame, the polarity of the last sub frame of each frame would be the same as that of the first sub frame of the succeeding frame, and it would not be possible to adequately eliminate the residual electric charges from the spatial light modulator 25 for each sub frame.

Therefore, the polarity pattern of the spatial light modulator 25 is reversed from one frame to another so that the polarities of two adjoining sub frames are always opposite to each other. Thereby, the residual electric charges are adequately removed from the spatial light modulator 25 for each sub frame, and an undesired stress to the spatial light modulator 25 can be avoided.

Figure 11:
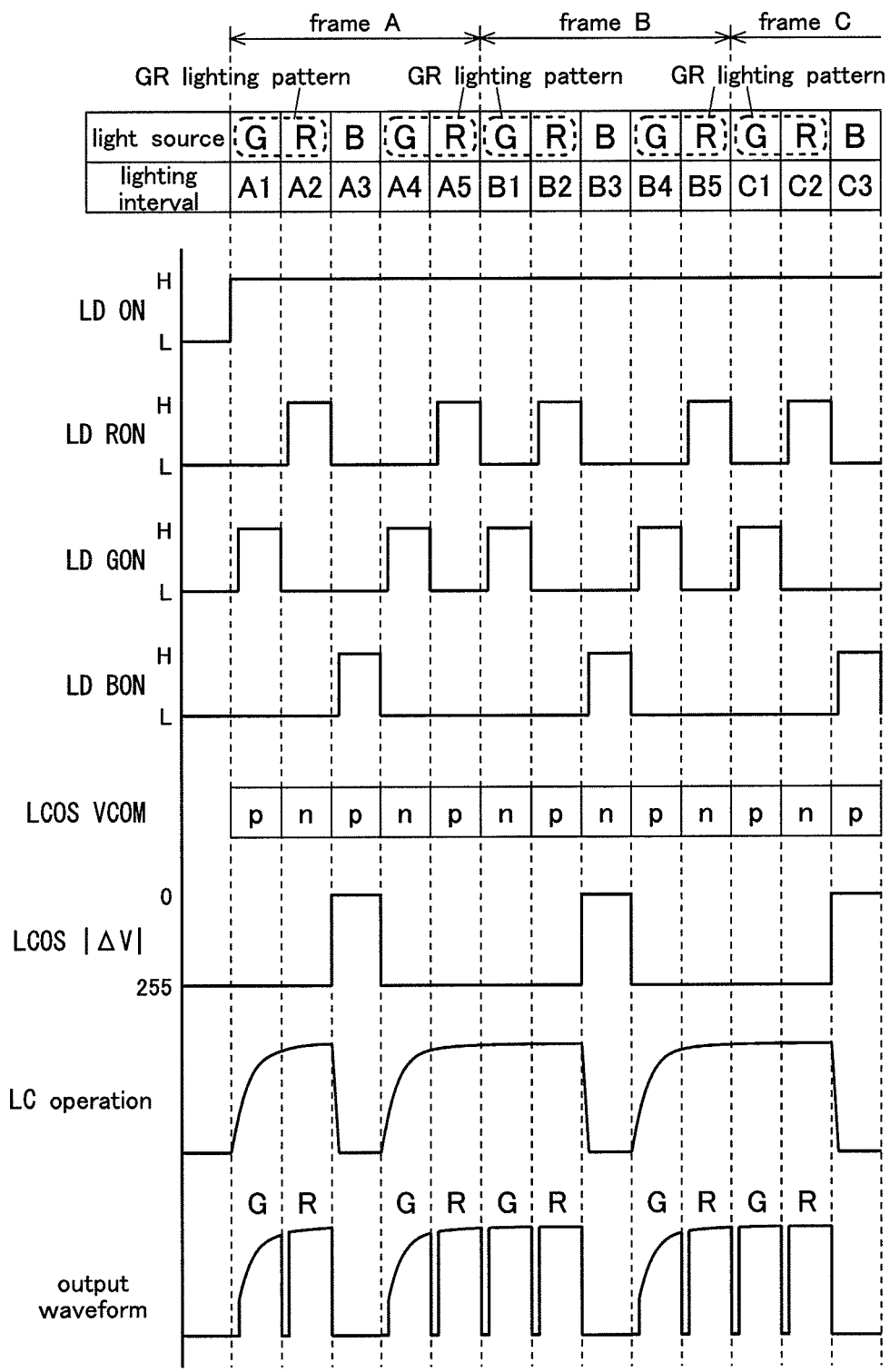
FIG. 11 is a time chart of the control signals for the red, green and blue laser light source units, the operation state of the spatial light modulator and the laser light output when displaying yellow color according to the second embodiment.

FIG. 11 shows the sequences of the control signals, the operation of the spatial light modulator 25 and the relevant waveforms when yellow color is displayed in the second embodiment. In the second embodiment, the lighting of green laser light and red laser light in that order (GR lighting pattern) occurs twice in each frame, and the lighting of red laser light and green laser light in that order (RG lighting pattern) does not occur. (In other words, the occurrences of the GR lighting pattern are more numerous than the occurrences of the RG lighting pattern.) Thus, as the lighting intervals for red and green colors having relatively higher luminosity factors occur more often than lighting intervals for blue color, the color breaking can be effectively minimized even when the switching speed of the different laser light sources and/or the response speed of the spatial light modulator 25 are not very high.

When yellow color is displayed consecutively over a plurality of frames, from the second frame onward, the last GR lighting pattern in one frame is followed by the first GR lighting pattern of the succeeding frame. In other words, two GR lighting patterns occur back to back and are followed and preceded by a blue lighting interval. The green lighting interval following a blue lighting interval is diminished in output while the following red, green and red lighting intervals are not diminished in output. The net result is that the deviation or shifting of the color phase of the green laser light from the standard green color is compensated by the reduction in the output of the green laser light when displaying yellow color (255, 255, 0) owing to the delay in the response of the spatial light modulator 25. As a result, the deviation of the displayed yellow color from the intended yellow color can be minimized, and can be brought close to the standard yellow color as shown in FIG. 5.

In this embodiment also, as each frame consists of an odd number of sub frames, the polarity pattern of the spatial light modulator 25 is reversed from one frame to another so that the polarities of two adjoining sub frames are always opposite to each other. Thereby, the residual electric charges are adequately removed from the spatial light modulator 25 for each sub frame, and an undesired stress to the spatial light modulator 25 can be avoided.

Figure 12:
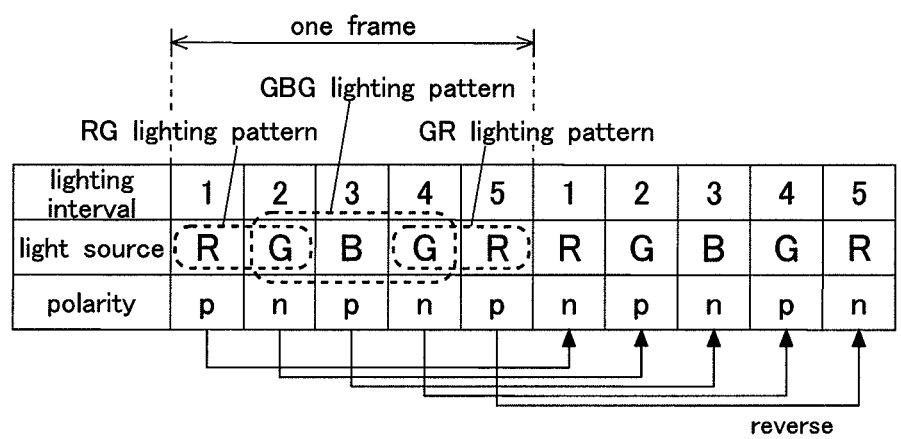
FIG. 12 shows the orders of activating the red, green and blue laser light source units and the polarity of the spatial light modulator according to a third embodiment of the present invention.

FIG. 12 shows the order of the lighting the red, green and blue laser light source units 22 to 24, and the associated changes in the polarity of the spatial light modulator 25 according to a third embodiment of the present invention. Each frame is divided into five sub frames (five lighting intervals) similarly as the second embodiment, but is modified from the second embodiment by replacing the first GR lighting pattern at the beginning of each frame with an RG lighting pattern. Therefore, a GR lighting pattern and an RG lighting pattern both occur once, and are separated by a blue lighting interval. Furthermore, each frame includes a GBG lighting pattern.

According to the third embodiment, similarly as the second embodiment, as the lighting intervals for red and green colors having relatively higher luminosity factors occur more often than lighting intervals for blue color, the color breaking can be avoided.

In this embodiment also, as each frame consists of an odd number of sub frames, the polarity pattern of the spatial light modulator 25 is reversed from one frame to another so that the polarities of two adjoining sub frames are always opposite to each other. Thereby, the residual electric charges are adequately removed from the spatial light modulator 25 for each sub frame, and an undesired stress to the spatial light modulator 25 can be avoided.

Figure 13:
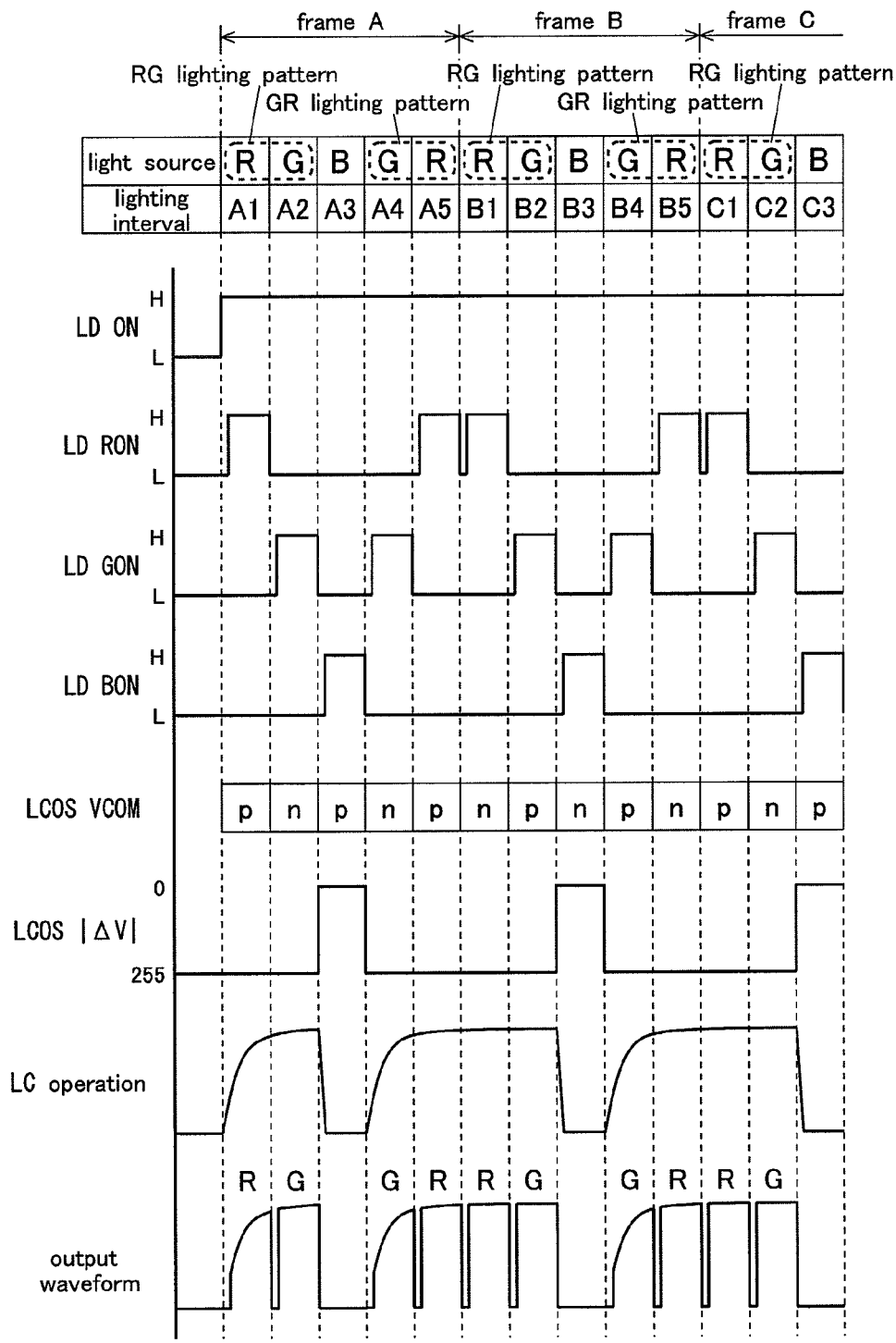
FIG. 13 is a time chart of the control signals for the red, green and blue laser light source units, the operation state of the spatial light modulator and the laser light output when displaying yellow color according to the third embodiment.

FIG. 13 shows the sequences of the control signals, the operation of the spatial light modulator 25 and the relevant waveforms when yellow color is displayed in the third embodiment.

In the third embodiment, the lighting of green laser light and red laser light in that order (GR lighting pattern) following a blue lighting interval occurs once in each frame or, in other words, the occurrence of a GR lighting pattern occurs less by one as compared with the second embodiment. However, when yellow color is displayed consecutively over a plurality of frames, from the second frame onward, the last GR lighting pattern in one frame is followed by the first RG lighting pattern of the succeeding frame so that there is no reduction in the output during the first red lighting interval in the RG pattern except for the first frame. Therefore, in the third embodiment also, the deviation of the displayed yellow color from the intended yellow color can be minimized, and can be brought close to the standard yellow color as shown in FIG. 5.

Also, as the lighting intervals for red and green colors having relatively higher luminosity factors occur more often than lighting intervals for blue color, the color breaking can be effectively minimized even when the switching speed of the different laser light sources and/or the response speed of the spatial light modulator 25 are not very high.

In this embodiment also, as each frame consists of an odd number of sub frames, the polarity pattern of the spatial light modulator 25 is reversed from one frame to another so that the polarities of two adjoining sub frames are always opposite to each other. Thereby, the residual electric charges are adequately removed from the spatial light modulator 25 for each sub frame, and an undesired stress to the spatial light modulator 25 can be avoided.

Figure 14:
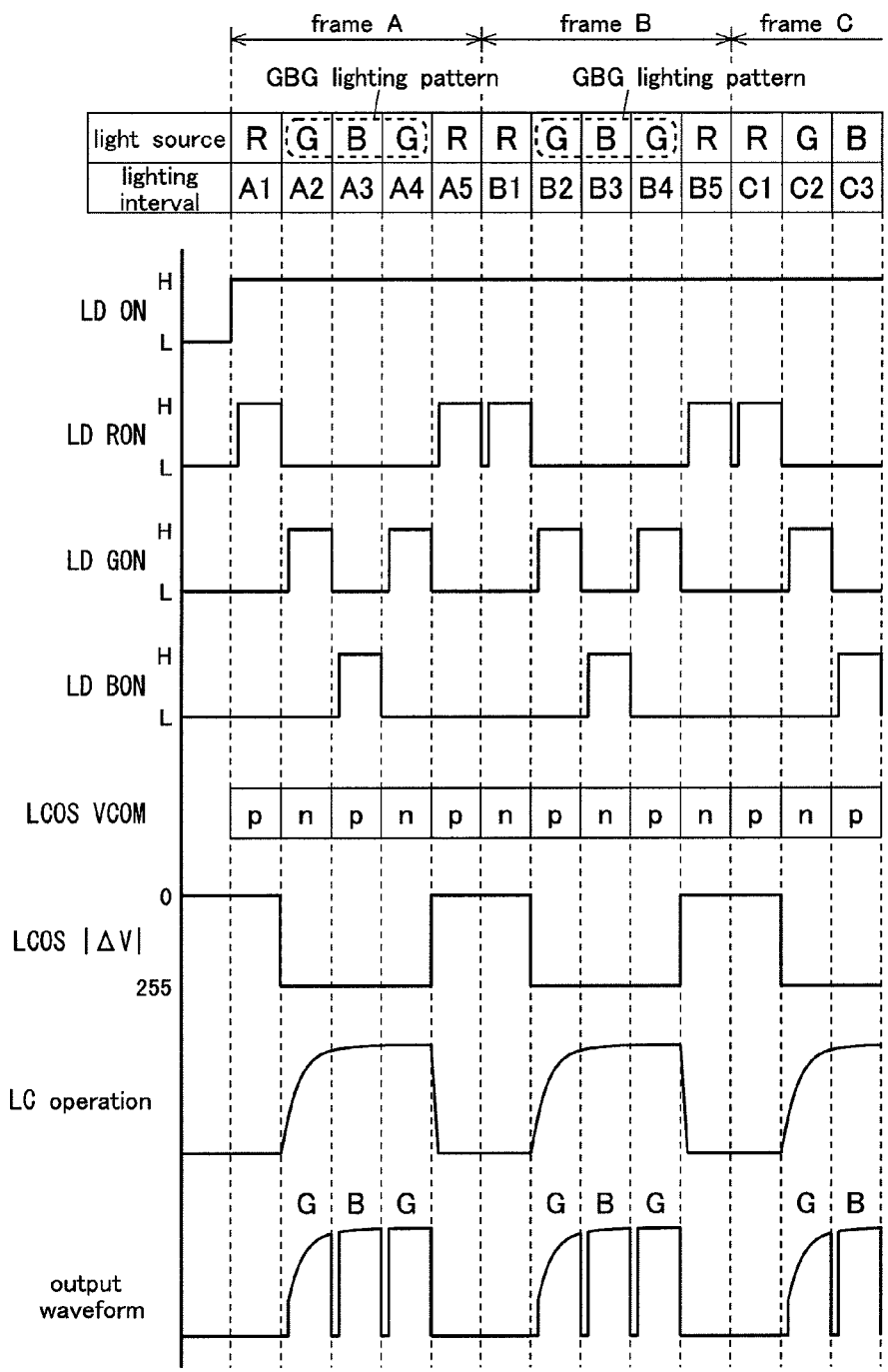
FIG. 14 is a time chart of the control signals for the red, green and blue laser light source units, the operation state of the spatial light modulator and the laser light output when displaying cyan color according to the third embodiment.

FIG. 14 shows the sequences of the control signals, the operation of the spatial light modulator 25 and the relevant waveforms when cyan color is displayed in the third embodiment.

As discussed earlier, the blue laser light emitted from the blue laser light source unit 24 (x=0.161, y=0.014) has a lower y value than the standard blue color (x=0.150, y=0.060) on the CIE xy color space chromaticity diagram. Therefore, the color phase shift in the blue laser light occurs in the direction toward more indigo color.

In the third embodiment, a GBG lighting pattern occurs in each frame. Therefore, the delay in the response of the spatial light modulator 25 causes the output of the first green lighting interval of the GBG lighting pattern to be diminished while the following blue and green lighting intervals are left unaffected. Therefore, the reduction in the output of the green laser output during the first green lighting interval of the GBG lighting pattern compensates for the phase deviation caused by the relatively high y value of the green laser light (x=0.170, y=0.796) so that the color phase shift of the displayed cyan color can be minimized, and brought close to the standard cyan color (x=0.225, y=0.330). In other words, according to the third embodiment, in addition to the yellow color produced by the combination of the red and green colors having relatively high luminous factors, the cyan color produced by the combination of the blue and green colors can be brought to the corresponding standard color.

FIG. 15 shows the order of the lighting the red, green and blue laser light source units 22 to 24, and the associated changes in the polarity of the spatial light modulator 25 according to a fourth embodiment of the present invention. Each frame is divided into four sub frames (four lighting intervals), and the red, green and blue laser light source units 22 to 24 are lighted in the order of red, green, blue and green. Therefore, a GR lighting pattern (lighting the laser light sources in the order of green and red) occurs over a pair of adjoining frames. In other words, green laser light is lighted during the last lighting interval of one frame and red laser light is lighted during the first lighting interval of the next frame. Also, a GBG lighting pattern lighting green, blue and green laser lights in that order exists in each frame.

Figure 16:
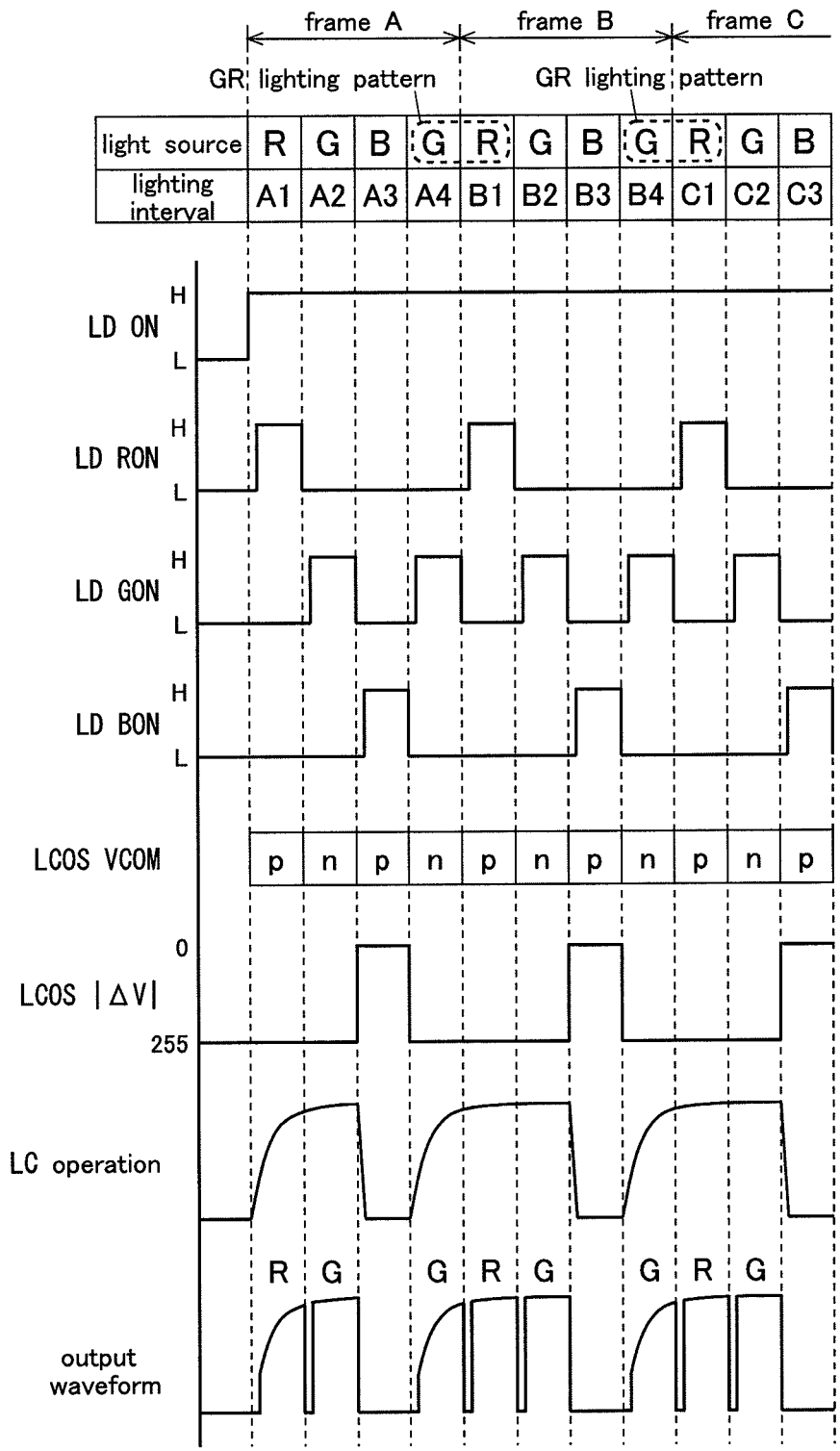
FIG. 16 is a time chart of the control signals for the red, green and blue laser light source units, the operation state of the spatial light modulator and the laser light output when displaying yellow color according to the fourth embodiment.

FIG. 16 shows the sequences of the control signals, the operation of the spatial light modulator 25 and the relevant waveforms when yellow color is displayed in the fourth embodiment.

When yellow laser light (255, 255, 0) is to be produced, the spatial light modulator 25 allows the red and green laser lights to be emitted. In this case, the laser lights of these colors are produced in the GR lighting pattern or in the order of green and red. Owing to the delay in the response of the spatial light modulator 25, the output of the green laser light that is produced first gets diminished so that there will be a shortage of green laser light.

As discussed earlier, the green laser light (x=0.170, y=0.796) emitted from the green laser light source unit 22 has a higher y value than the standard green color (x=0.300, y=0.600). In other words, the green laser light shifts the color phase of the displayed green color in the direction of more pure green color. The red laser light (x=0.719, y=0.281) emitted from the red laser light source unit 23 may also deviate from the standard red color (x=0.640, y=0.330), but the color phase shift of the green laser light is more dominant than that of the red laser light.

Therefore, when displaying yellow color (255, 255, 0), the deviation or shifting of the color phase of the green laser light is compensated by the reduction in the output of the green laser light owing to the delay in the response of the spatial light modulator 25. As a result, the deviation of the displayed yellow color from the intended yellow color can be minimized, and can be brought close to the standard yellow color (x=0.470, y=0.465) as shown in FIG. 5.

In this embodiment, when displaying the yellow laser light, an RG lighting pattern occurs at the beginning of each frame, but this RG pattern is preceded by the emission of the green laser light occurring at the end of the preceding frame so that the RG pattern occurs only as part of a GRG pattern except for the occurrence of the isolated RG pattern in the very first frame. In other words, an independent RG pattern occurs only in the very first frame, and the succeeding lighting of red and green laser lights occur only in the GRG pattern. As the occurrences of the GRG pattern is typically far more numerous than the single occurrence of the RG pattern in each instance of displaying yellow light, the single occurrence of the RG pattern is too insignificant to produce any appreciable impact on the displayed yellow color.

Figure 17:
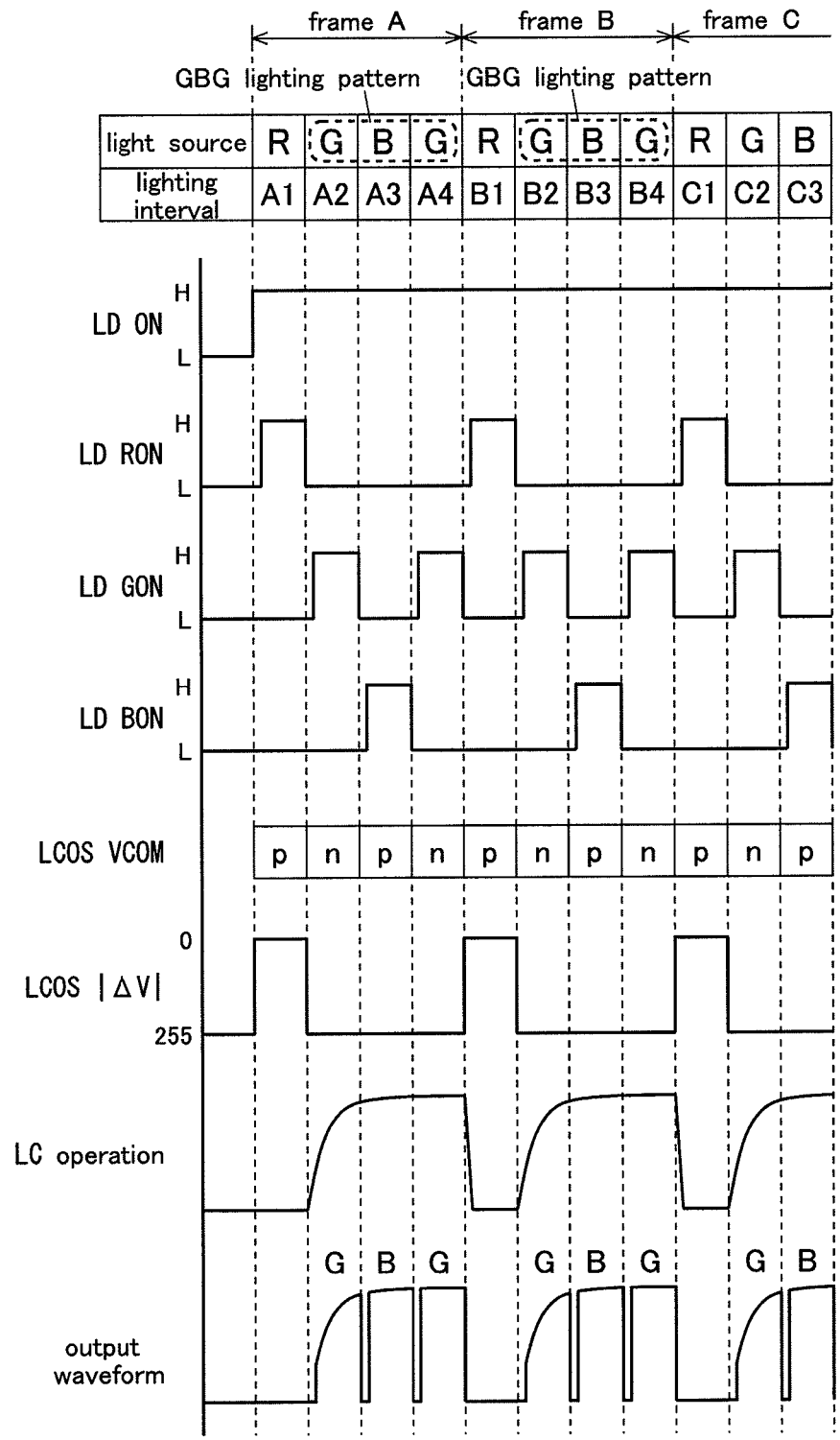
FIG. 17 is a time chart of the control signals for the red, green and blue laser light source units, the operation state of the spatial light modulator and the laser light output when displaying cyan color according to the fourth embodiment.

When cyan color is to be displayed (0, 255, 255) according to the fourth embodiment, the spatial light modulator 25 allows the green and blue laser lights to be emitted. According to the fourth embodiment, a GBG pattern occurs in each frame, or the green, blue and green laser lights are emitted in that order as shown in FIG. 17. At this time, owing to the delay in the response of the spatial light modulator 25, the output of the green laser light that is produced first gets diminished so that there will be a shortage of green laser light.

As discussed earlier, the green laser light (x=0.170, y=0.796) emitted from the green laser light source unit 22 has a higher y value than the standard green color (x=0.300, y=0.600). In other words, the green laser light shifts the color phase of the displayed green color in the direction of more pure green color. The blue laser light (x=0.161, y=0.014) emitted from the blue laser light source unit 23 may also deviate from the standard red color (x=0.150, y=0.060), but the color phase shift of the green laser light is more dominant than that of the blue laser light.

Therefore, when displaying cyan color, the deviation or shifting of the color phase of the green laser light is compensated by the reduction in the output of the green laser light owing to the delay in the response of the spatial light modulator 25. As a result, the deviation of the displayed cyan color from the intended cyan color can be minimized, and can be brought close to the standard cyan color (x=0.225, y=0.330) as shown in FIG. 5. Thus, the fourth embodiment can produce not only yellow color that is produced by combining red and green colors having relatively high luminosity factors close to the corresponding standard color, but also cyan color that is produced by combining blue and green colors.

According to the fourth embodiment, the second red and blue lighting intervals are eliminated when compared with the prior art shown in FIG. 6 so that each frame contains two green lighting intervals while there is only one blue lighting interval and one green lighting interval. In other words, the green lighting interval which is associated with a high luminosity factor (as is the case with the red lighting interval) occurs more frequently than the blue lighting interval in each frame. Therefore, the color breaking can be effectively minimized even when the switching speed of the different laser light sources and/or the response speed of the spatial light modulator 25 are not very high.

Figure 18:
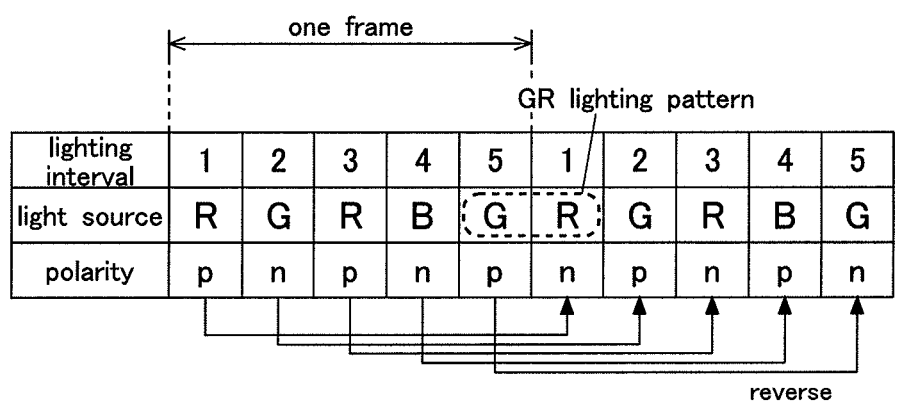
FIG. 18 shows the orders of activating the red, green and blue laser light source units and the polarity of the spatial light modulator according to a fifth embodiment of the present invention.

FIG. 18 shows the order of the lighting the red, green and blue laser light source units 22 to 24, and the associated changes in the polarity of the spatial light modulator 25 according to a fifth embodiment of the present invention. Each frame is divided into five sub frames (five lighting intervals), and the red, green and blue laser light source units 22 to 24 are lighted in the order of red, green, red, blue and green. Similarly as in the previous embodiment, a GR lighting pattern (lighting the laser light sources in the order of green and red) occurs across a pair of adjoining frames.

When yellow laser light (255, 255, 0) is to be produced in the fifth embodiment, the spatial light modulator 25 allows the red and green laser lights to be emitted. In this case, the laser lights of these colors are produced in the GR lighting pattern or in the order of green and red. Owing to the delay in the response of the spatial light modulator 25, the output of the green laser light that is produced first gets diminished so that there will be a shortage of green laser light. This shortage of green laser light compensates the phase shift of the green laser light produced by the green laser light source unit from the standard green color.

In the fifth embodiment, each frame contains two green lighting intervals and two red lighting intervals while there is only one blue lighting interval. In other words, the green and red lighting intervals which are associated with high luminosity factors occur more frequency than the blue lighting interval in each frame. Therefore, the color breaking can be effectively minimized even when the switching speed of the different laser light sources and/or the response speed of the spatial light modulator 25 are not very high.

In the fifth embodiment, each frame consists of an odd number of sub frames. Therefore, if a same pattern of the polarity of the spatial light modulator 25 were repeated for each frame, the polarity of the last sub frame of each frame would be the same as that of the first sub frame of the succeeding frame, and it would not be possible to adequately eliminate the residual electric charges from the spatial light modulator 25 for each sub frame.

Therefore, the polarity pattern of the spatial light modulator 25 is reversed from one frame to another so that the polarities of two adjoining sub frames are always opposite to each other. Thereby, the residual electric charges are adequately removed from the spatial light modulator 25 for each sub frame, and an undesired stress to the spatial light modulator 25 can be avoided.

FIG. 19 shows the order of the lighting the red, green and blue laser light source units 22 to 24, and the associated changes in the polarity of the spatial light modulator 25 according to a sixth embodiment of the present invention. In this case, each frame is divided into four lighting intervals, and the laser light source units 22 to 24 are lighted in the order of red, green, blue and green similarly as the fourth embodiment. However, each lighting interval consists of two pulses of laser light of a corresponding color.

As each lighting interval consists of two distinct pulses of laser light, the time duration of the lighting of each laser light source unit is reduced. This contributes the reduction in the temperature rises in the laser light source units 22 to 24, and compensate for the delayed response of the spatial light modulator 25.

In this embodiment also, a GR lighting pattern and a GBG lighting pattern are included in each frame so that the shortage of green color owing to the delayed response of the spatial light modulator 25 and the color phase shift in the green laser light produced from the green laser light source unit 22 are made to cancel out each other, and the color phase shifts in displayed yellow and cyan colors can be minimized.

In the foregoing embodiments, no independent RG lighting pattern occurs except for in an overlapping relationship with a GR pattern. However, it is also possible to have the independent RG lighting pattern to coexist with an RG pattern. The present invention reduces the color shift in intermediate colors by canceling the color phase shift of the green laser light by taking advantage of the shortage of green color produced by a GR lighting pattern. An independent RG pattern causes a shortage of red color, and thereby diminishes the effect created by the GR lighting pattern. Therefore, when the RG pattern and GR pattern to coexist, the GR lighting pattern should occur no less frequently than the independent RG lighting pattern. Thereby, the influences of the independent RG pattern can be controlled so that the color phase shift of intermediate colors may be reduced.

The image display system of the present invention is highly effective in minimizing the color shift of intermediate colors produced by combining different colors including at least one of the red and green colors having relatively high luminous factors in an image display system based on a time sharing process using laser light source units using semiconductor lasers as light sources.

Although the present invention has been described in terms of preferred embodiments thereof, it is obvious to a person skilled in the art that various alterations and modifications are possible without departing from the scope of the present invention which is set forth in the appended claims. The various components that are used in the image display system are not necessarily indispensable for the present invention, but may be omitted or substituted in implementing the present invention without departing from the spirit of the present invention.

The contents of the original Japanese patent applications on which the Paris Convention priority claim is made for the present application as well as the contents of the prior art references mentioned in this application are incorporated in this application by reference.

The invention claimed is:
1. An image display system, comprising:
a red laser light source configured to emit red laser light;
a green laser light source configured to emit green laser light having a y value greater than standard green in the CIE xy color space chromaticity diagram;
a blue laser light source configured to emit blue laser light;
a spatial light modulator, comprising a single liquid crystal display, configured to modulate the red, green and blue laser light emitted from the respective laser light sources in a time sharing manner according to a video signal; and
a controller configured to control lighting of each laser light source during at least one lighting interval included in each video frame and to control an operation of the liquid crystal display;
wherein the controller is configured to light the green and red laser light sources in this order in each frame.
2. The image display system according to claim 1, wherein the controller is configured to light at least one of the red and green light sources more frequently than the blue laser light source in each frame.
3. The image display system according to claim 1, wherein the controller is configured to light the green, blue and green light sources in this order in each frame.
4. An image display system comprising:
a red laser light source configured to emit red laser light;

a green laser light source configured to emit green laser light having a relatively high y value in the CIE xy color space chromaticity diagram;
a blue laser light source configured to emit blue laser light;
a spatial light modulator configured to modulate the red, green and blue laser light emitted from the respective laser light sources in a time sharing manner according to a video signal; and
a controller configured to control lighting of each laser light source during at least one lighting interval included in each video frame and to control an operation of the spatial light modulator;
wherein the controller is configured to light the green and red laser light sources in this order in each frame, and
wherein each frame consists of an odd number of lighting intervals, and a polarity pattern of the spatial light modulator is reversed from one frame to another.

5. An image display system comprising:
a red laser light source configured to emit red laser light;
a green laser light source configured to emit green laser light having a relatively high y value in the CIE xy color space chromaticity diagram;
a blue laser light source configured to emit blue laser light;
a spatial light modulator configured to modulate the red, green and blue laser light emitted from the respective laser light sources in a time sharing manner according to a video signal; and
a controller configured to control lighting of each laser light source during at least one lighting interval included in each video frame and to control an operation of the spatial light modulator;
wherein the controller is configured to light the green and red laser light sources in this order in each frame, and
wherein the green laser light source unit comprises a semiconductor laser that generates an excitation laser light, a solid laser device that generates an infrared laser light by being excited by the excitation laser light generated by the semiconductor laser and a wavelength converter that converts the infrared laser light generated by the solid laser device into green laser light.

6. The image display system according to claim 1, wherein the green and red laser light sources are lit in that this order from an end of one frame to a beginning of a succeeding frame.

7. The image display system according to claim 1, wherein the y value of the green laser light is greater than 0.600 of the standard green.

8. The image display system according to claim 1, wherein a difference in y value between the green laser light and a standard green is greater than a difference in y value between the red laser light and a standard red, and is greater than a difference in y value between the blue laser light and a standard blue.

9. The image display system according to claim 4, wherein the y value of the green laser light is greater than 0.600 of the standard green.

10. The image display system according to claim 5, wherein the y value of the green laser light is greater than 0.600 of the standard green.

* * * * *